United States Patent
Fan et al.

(10) Patent No.: US 7,904,397 B2
(45) Date of Patent: Mar. 8, 2011

(54) SYSTEM AND METHOD FOR SCALABLE COST-SENSITIVE LEARNING

(75) Inventors: Wei Fan, New York, NY (US); Haixun Wang, Tarrytown, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/690,502

(22) Filed: Jan. 20, 2010

(65) Prior Publication Data

US 2010/0169252 A1 Jul. 1, 2010

Related U.S. Application Data

(63) Continuation of application No. 10/725,378, filed on Dec. 3, 2003, now abandoned.

(51) Int. Cl.
G06F 15/18 (2006.01)
G06N 3/00 (2006.01)
G06N 3/12 (2006.01)

(52) U.S. Cl. .......................................... 706/13

(58) Field of Classification Search .................. None
See application file for complete search history.

(56) References Cited

PUBLICATIONS

Stolfo et al. 'JAM: Java agents for meta learning over distributed databases': 1997, American Association for Artificial Intelligence.*
"Progressive Modeling", Fan, Wang, Yu, Lo, Stofo, 2002, IEEE, 163-179.
"Distributed Data Mining in Credit Card Fraud Detection", Chan, 1999, IEEE, 1094-7167, pp. 67-74.
"JAM: Java Agents for Meta-Learning over Distributed Databases"; Stofo, American Association for Artificial Intelligence, 1997.

* cited by examiner

*Primary Examiner* — Donald Sparks
*Assistant Examiner* — Peter Coughlan
(74) *Attorney, Agent, or Firm* — McGinn IP Law Group, PLLC

(57) ABSTRACT

A method (and structure) for processing an inductive learning model for a dataset of examples, includes dividing the dataset of examples into a plurality of subsets of data and generating, using a processor on a computer, a learning model using examples of a first subset of data of the plurality of subsets of data. The learning model being generated for the first subset comprises an initial stage of an evolving aggregate learning model (ensemble model) for an entirety of the dataset, the ensemble model thereby providing an evolving estimated learning model for the entirety of the dataset if all the subsets were to be processed. The generating of the learning model using data from a subset includes calculating a value for at least one parameter that provides an objective indication of an adequacy of a current stage of the ensemble model.

20 Claims, 11 Drawing Sheets

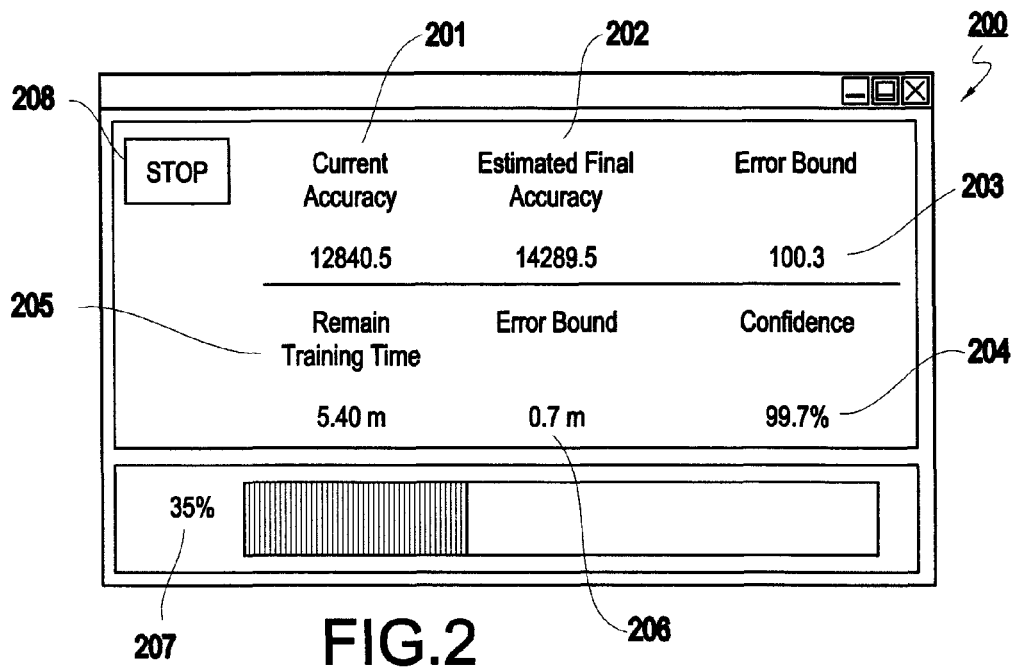
FIG.2
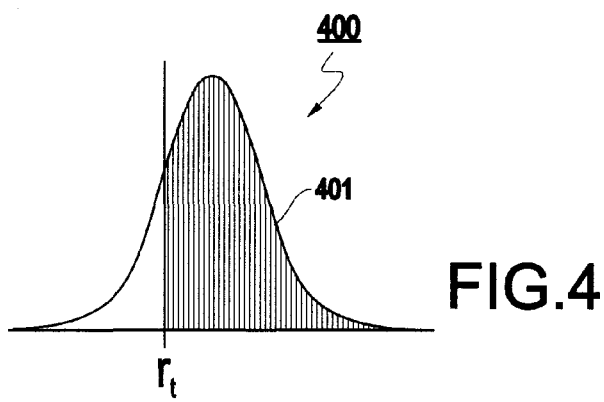
FIG.3
FIG.4

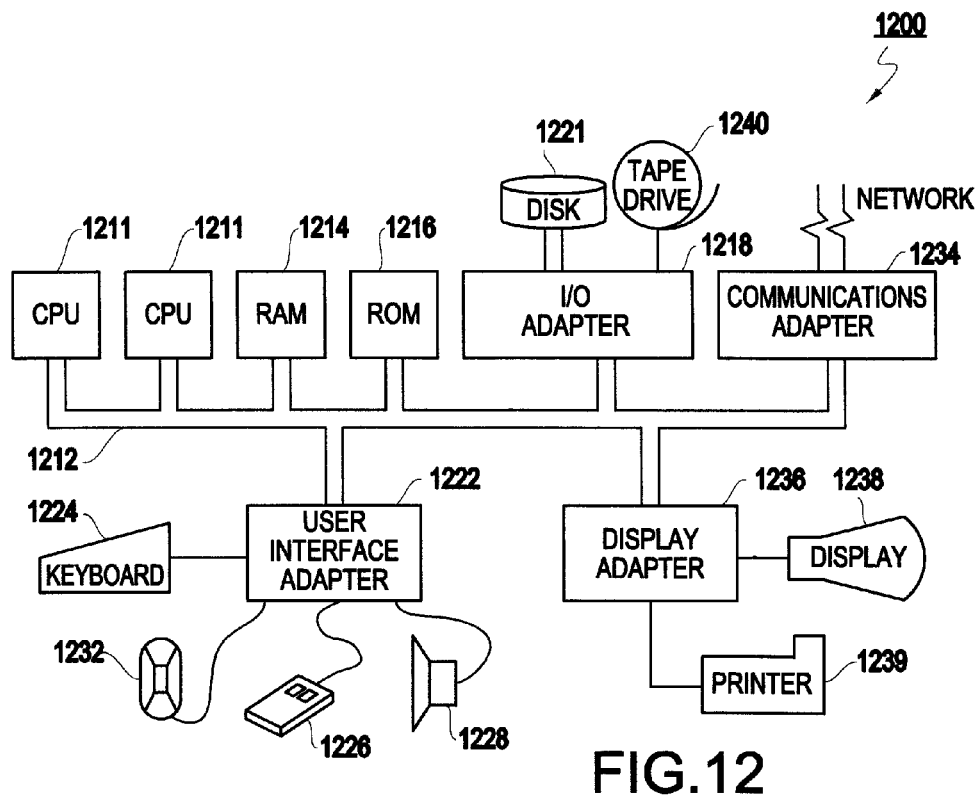
FIG.12
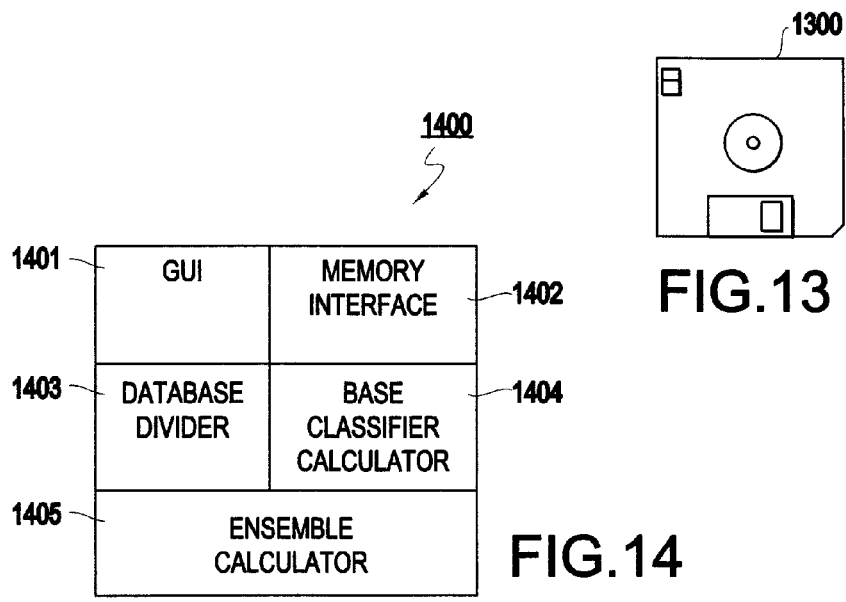
FIG.13
FIG.14

SYSTEM AND METHOD FOR SCALABLE COST-SENSITIVE LEARNING

This Application is a Continuation Application of U.S. patent application Ser. No. 10/725,378, filed on Dec. 3, 2003, now abandoned.

BACKGROUND OF THE INVENTION

1. Field of the Invention

The present invention generally relates to a technique of inductive learning. More specifically, an inductive model is built both "accurately" and "efficiently" by dividing a database of examples into N disjoint subsets of data, and a learning model (base classifier), including a prediction of accuracy, is sequentially developed for each subset and integrated into an evolving aggregate (ensemble) learning model for the entire database. The aggregate model is incrementally updated by each completed subset model. The prediction of accuracy provides a quantitative measure upon which to judge the benefit of continuing processing for remaining subsets in the database or to terminate at an intermediate stage.

2. Description of the Related Art

Modeling is a technique to learn a model from a set of given examples of the form $\{(x_1, y_1), (x_2, y_2), \ldots, (x_n, y_n)\}$. Each example $(x_i, y_i)$ is a feature vector, $x_i$. The values in the feature vector could be either discrete, such as someone's marital status, or continuous, such as someone's age and income. Y is taken from a discrete set of class labels such as {donor, non-donor} or {fraud, non-fraud}.

The learning task is to predict a model $y=f(x)$ to predict the class label from an example with a feature vector but without the true class label.

Inductive learning has a wide range of applications that include, for example, fraud detection, intrusion detection, charity donation, security and exchange, loan approval, animation, and car design, among many others.

The present invention teaches a new framework of scalable cost-sensitive learning. An exemplary scenario for discussing the techniques of the present invention is a charity donation dataset from which a subset of the data is to be chosen as individuals to whom to send campaign letters. Assuming that the cost of a campaign letter is $0.68, it should be apparent that it would be beneficial to send a letter only if the solicited person will donate at least $0.68.

That is, a learning model for this scenario must be taught how to choose individuals from a database containing information for individuals to be targeted for letters. Because there is a cost associated with the letters, and each individual will either donate different amount of money or does not donate at all, this model is cost-sensitive. The overall accuracy or benefits is the total amount of donated charity minus the total overhead to send solicitation letters.

A second scenario is fraud detection, such as credit card fraud detection. Fraud challenging and investigation are not free. There is an intrinsic cost associated with each fraud case investigation. Assuming that challenging a potential fraud costs $90, it is obvious that only if the "expected loss" of a fraud (when the same instance is sampled repeated) is more than $90, it is worthwhile for a credit card company to take actions.

As should be apparent, there is also a second cost associated with the development of the model that is related to the cost of the computer time and resources necessary to develop a model over a database, particularly in scenarios where the database contains a large amount of data.

Currently, a number of learning algorithms are conventionally used for modeling expected investment strategies in such scenarios as the campaign letter scenario, for example, decision tree learner C4.5®, rule builder RIPPER®, and the naïve Bayes learner.

In a database, each data entry is described by a series of feature values. For the charity donation example, each entry might describe a particular individual's income level, location lived, location worked, education background, gender, family status, past donation history, and perhaps other features.

The aforementioned C4.5® decision algorithm constructs a decision tree model from a dataset or a set of examples of the above form. A decision tree is a DAG (or Directed Acyclic Graph) with a single root. To build a decision tree, the learner first picks the most distinguishing feature from the set of features.

For example, the most distinguishing feature might be someone's income level. Then, the examples in the dataset will be "sorted" by their corresponding value of the chosen feature. For example, individual with lower income will be sorted through a different path than individuals with higher income. This process is repeated until either there is no more feature to use or the examples in a node all belong to one single category, such as donor or non-donor.

RIPPER® is another way to build inductive models. The model is a set of IF THEN rules. The naïve Bayes method uses the Bayesian Rule to build models.

Using these conventional methods, a user can experiment with different algorithms, parameters, and feature selections and, thereby, evaluate one or more models to be ultimately used for the intended application, such as selecting the individuals to whom campaign letters will be sent.

A problem recognized by the present inventors is that, in current learning model methods, the entire database must be evaluated before the effects of the hypothetical parameters for the test model are known. Depending upon the size of the database, each such test scenario will require much computer time (sometimes many hours or even days) and cost, and it can become prohibitive to spend so much effort in the development of an optimal model to perform the intended task.

Hence, there is currently no method that efficiently models the cost-benefit tradeoff short of taking time and computer resources to analyze the entire database and predicting the accuracy of the model for whose parameters are undergoing evaluation.

SUMMARY OF THE INVENTION

In view of the foregoing exemplary problems, drawbacks, and disadvantages of the conventional methods, an exemplary feature of the present invention is to provide a structure and method for an inductive learning technique that significantly increases the accuracy of the basic inductive learning model.

It is another exemplary feature of the present invention to provide a technique in which throughput is increased by at least ten to twenty times the throughput of the basic inductive learning model.

To achieve the above exemplary features and others, in a first exemplary aspect of the present invention, described herein is a method (and structure) of processing an inductive learning model for a dataset of examples, including dividing the dataset into N subsets of data and developing an estimated learning model for the dataset by developing a learning model for a first of the N subsets.

In a second exemplary aspect of the present invention, also described herein is a system to process an inductive learning model for a dataset of example data, including one or more of: a memory containing one or more of N segments of the example data, wherein each segment of example data comprises data for calculating a base classifier for an ensemble model of the dataset; a base classifier calculator for developing a learning model for data in one of the N subsets; an ensemble calculator for progressively developing an ensemble model of the database of examples by successively integrating a base classifier from successive ones of the N segments; a memory interface to retrieve data from the database and to store data as the inductive learning model is progressively developed; and a graphic user interface to allow a user to at least one of enter parameters, to control the progressive development of the ensemble model, and to at least one of display and printout results of the progressive development.

In a third exemplary aspect of the present invention, also described herein is a method of providing a service, including at least one of: providing a database of example data to be used to process an inductive learning model for the example data, wherein the inductive learning model is to be derived by dividing the example data into N segments and using at least one of the N segments of example data to derive a base classifier model; receiving the database of example data and executing the above-described method of deriving the inductive learning model; providing an inductive learning model as derived in the above-described manner; executing an application of an inductive learning model as derived in the above-described manner; and receiving a result of the executing the application.

In a fourth exemplary aspect of the present invention, also described herein is a method of deploying computing infrastructure, including integrating computer-readable code into a computing system, wherein the code in combination with the computing system is capable of processing an inductive learning model for a dataset of examples by dividing the dataset into N subsets of data and developing an estimated learning model for the dataset by developing a learning model for a first of the N subsets.

In a fifth exemplary aspect of the present invention, also described herein is a signal-bearing medium tangibly embodying a program of machine-readable instructions executable by a digital processing apparatus to perform the above-described method of processing an inductive learning model for a dataset of examples.

In a sixth exemplary aspect of the present invention, also described herein is a method of at least one of increasing a speed of development of a learning model for a dataset of examples and increasing an accuracy of the learning model, including dividing the dataset into N subsets of data and developing an estimated learning model for the dataset by developing a learning model for a first subset of the N subsets.

In a seventh exemplary aspect of the present invention, also described herein is a method of developing a predictive model, including, for a dataset comprising a plurality of elements, each element comprising a feature vector, the dataset further comprising a true class label for at least a portion of the plurality of elements, the true class labels allowing the dataset to be characterized as having a plurality of classes, dividing at least a part of the portion of the plurality of elements having the true class label into N segments of elements, and learning a model for elements in at least one of the N segments, as an estimate for a model for all of the dataset.

With the above and other exemplary aspects, the present invention provides a method to improve learning model development by increasing accuracy of the ensemble, by decreasing time to develop a sufficiently accurate ensemble, and by providing quantitative measures by which a user (e.g., one developing the model or implementing an application based on the model) can decide when to terminate the model development because the ensemble is predicted as being sufficiently accurate.

BRIEF DESCRIPTION OF THE DRAWINGS

The foregoing and other exemplary features, aspects and advantages will be better understood from the following detailed description of an exemplary embodiment of the invention with reference to the drawings, in which:

FIG. 2 provides an exemplary display 200 of a snapshot of an interactive scenario in which both accuracy and remaining training time are estimated and displayed;

FIG. 3 shows an exemplary benefit matrix 300 for the charity donation scenario;

FIG. 4 shows how the normal density curve 400 can be used to estimate accuracy;

FIG. 12 illustrates an exemplary hardware/information handling system 1200 for incorporating the present invention therein;

FIG. 13 illustrates a signal bearing medium 1300 (e.g., storage medium) for storing steps of a program of a method according to the present invention; and FIG. 14 illustrate exemplary software modules in a computer program 1400 for executing the present invention.

DETAILED DESCRIPTION OF EXEMPLARY EMBODIMENTS OF THE INVENTION

Figure 1:
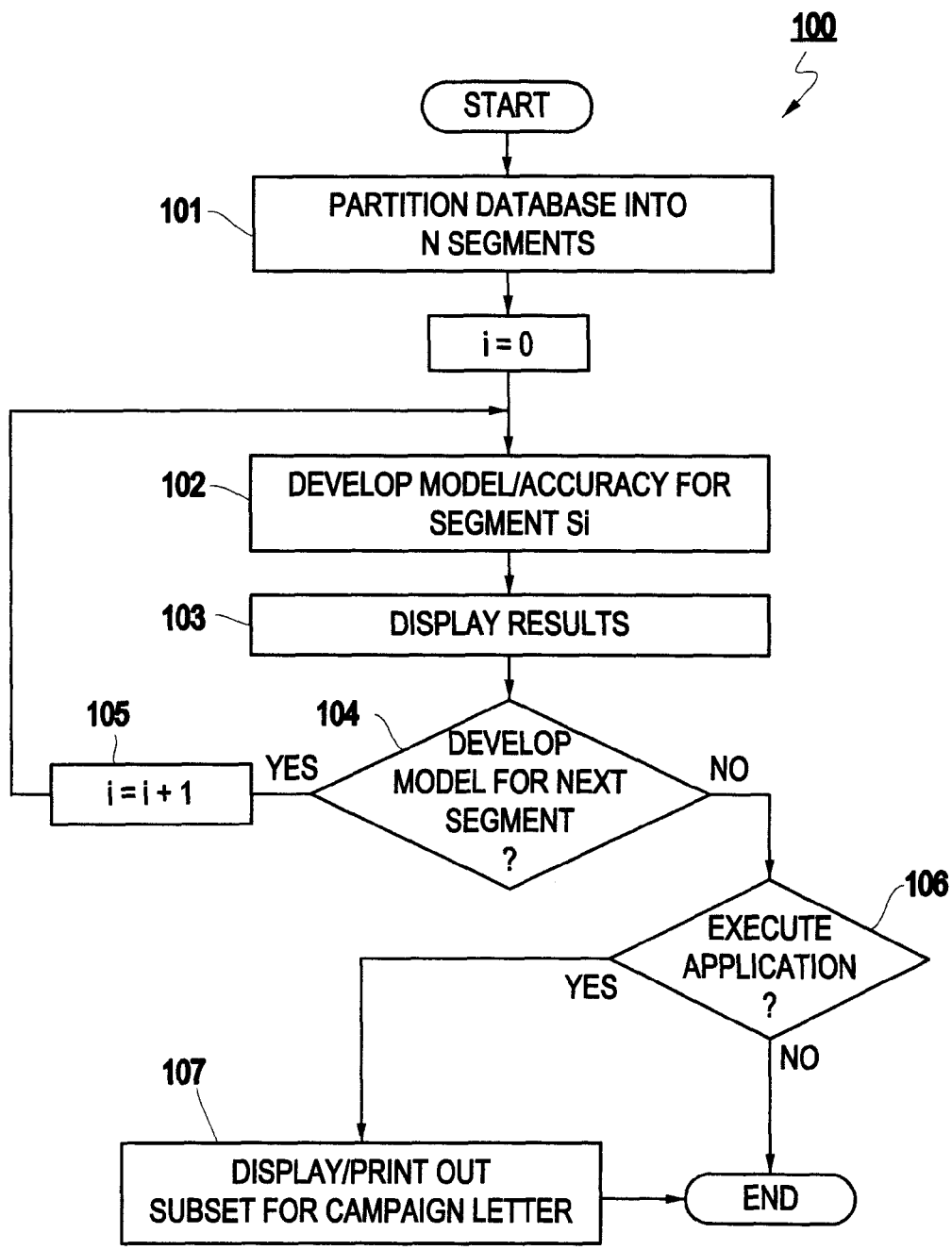
FIG. 1 provides a flowchart 100 of one exemplary method that demonstrates an overview of concepts of the present invention.

Referring now to the drawings, and more particularly to FIGS. 1-14, exemplary embodiments for a new framework of scalable cost-sensitive learning are now presented. The illustrative scenario of a charity donation database, from which is to be selected a subset of individuals to whom to send campaign letters, will continue to be used for teaching the concepts of the present invention.

As an introduction, disclosed herein is a method and structure for learning a model using ensembles of classifiers. First, the original, potentially large dataset is partitioned into multiple subsets. Base classifiers are learned from these data subsets, one by one, sequentially. The accuracy of the current ensemble comprised of models computed at any point in the processing is reported to the user.

At the same time, the overall accuracy of the final ensemble comprised of every single model computed from every data subset is statistically estimated and also reported to the end user. These estimates include a lower bound and an upper bound, along with a confidence interval.

Remaining training time is also statistically estimated and reported to the end user. Based on the estimated accuracy and remaining training time, the end user can decide whether it is worthwhile to continue the learning process or, instead, be contented with the current results and stop the processing of the entire dataset.

The discussion below also discloses a graphic user interface (GUI) to implement the inventive process in practice, as well as providing the statistical theorems to prove the soundness of the inventive approach.

FIG. 1 shows an exemplary flowchart 100 of the technique of the present invention. In step 101, a relevant database is partitioned first into a training set and a validation set and then partitioned into a number N of segments or subsets. That is, continuing with the charity donation example, it is assumed that the database contains data on at least one previous campaign effort and includes relevant attributes, such as age, location, income, job description, etc., for a number of individuals from that earlier campaign.

Depending upon the size of the original database, the data can be divided into a number N of segments by any appropriate method, including a simple random technique. Since the present invention uses statistical modeling, it should be apparent that the size of each segment can be determined by techniques known in the art to incorporate a statistically meaningful number of individuals. It should also be apparent that the number N of segments will depend upon the number of entries in the original database and the number of individuals required to make each segment statistically meaningful.

It should also be apparent to one of ordinary skill in the art, after reading the present application, that the method of selecting the number N is not particularly significant to the present invention, and that N can be selected by any number of ways. As examples, one of ordinary skill in the art would readily recognize that the selection of N could be manually entered via a graphical user interface (GUI), as one input parameter provided by the user during the initial parameter inputs for the model development process, or N might be automatically determined by a software module that first evaluates the size of the database and then automatically determines a number N of database segments, as based on such factors as statistical constraints and the size of the database.

In step 102, a model, hereinafter also referred to as a "base classifier", for each segment is sequentially trained. In the exemplary embodiment, each base classifier becomes an incremental input into the final model, hereinafter also referred to as the "ensemble", for the overall database data. That is, the base classifiers incrementally are integrated to form the ensemble model.

In step 103, the evolving ensemble model is displayed, as it progressively develops.

In step 104, the user can optionally continue the process for the next increment (e.g., the base classifier for the next subset of the N subsets of data). Although this flowchart shows termination as optional only upon completion of each segment base classifier, it would be readily recognized by one of ordinary skill in the art, after reading the present application, that such termination could actually occur at any time during the processing.

When the processing is stopped in step 104, either prematurely by the user or because all segments have been modeled, the user can then decide, in step 106, whether the intended application should be executed in step 107 in order to, for example, display or print out the names of individuals from a database to whom letters are to be sent for the campaign, or even print out the letters and envelopes for these selected individuals.

In the terminology of the present invention, each of the subsets contains data to train a "classifier". The classifier is a model trained from the data. A "base classifier" is a classifier trained from each subset.

As can be seen by the discussion above, a key aspect of the present invention, in which subsets are each modeled to incrementally form a composite model, is that the composite modeling can be easily stopped at any early or intermediate stage.

Thus, considering the above example in more detail, in a database containing, for example, 1,000,000 individuals, there might be exemplarily 100 subsets, each including 10,000 individuals. Depending upon modeling complexity, current methods for developing a complete model for the entire 100 subsets might take, for example, several hours or even days of computer time.

In contrast, using the present invention, based on results of the initial subset models, the user is able to determine whether the time and expense of continuing to develop a complete model would be cost effective or whether to stop the processing and enter a new set of model parameters to re-evaluate a new strategy for the learning model development.

It should be apparent that the user might continue entering new sets of parameters for evaluation, until a set of model parameters is finally determined as being satisfactory. Moreover, using the present invention, the user will also be able to see a quantitative prediction for the results of each current set of parameters.

In more detail, as soon as learning starts, the technique of the present invention begins to compute intermediate models, and, exemplarily, also to report current accuracy and estimated final accuracy, on a holdout validation set, and estimated remaining training time. For a cost-sensitive problem, accuracy is measured in benefits such as dollar amounts.

The term "accuracy" is meant herein to interchangeably mean traditional percentage accuracy (that measures the percentage of examples being classified correctly) and benefits (in terms of dollar amount, such as the total amount of donated charity minus the cost of mailing, in the charity donation example).

FIG. 2 shows an exemplary snapshot of the learning process in accordance with the present invention, using a graphic user interface (GUI) display 200 in an interactive scenario where both accuracy and remaining training time are estimated.

The exemplary GUI display in FIG. 2 indicates that the accuracy 203, 203 on the holdout validation set (total donated charity, minus the cost of mailing to both donors and non-donors) 201 for the algorithm using the current intermediate model is $12,840.50. In this exemplary snapshot, the accuracy 202, 203 of the complete model on the holdout validation set, when learning completes, is estimated to be $14,289.50±100.3 with at least 99.7% confidence 204. The additional training time 205, 206 to generate the complete model is estimated to be 5.40±0.70 minutes with at least 99.7% confidence.

Currently, as displayed in the lower indicator 207, approximately 35% of the database contents have been processed up through the snapshot shown in FIG. 2. The information on the display 200 continuously refreshes whenever a new intermediate model is produced, until either the user explicitly terminates the learning process (e.g., using the "STOP" command input command 208 in FIG. 2) or the complete model is generated for all segments $S_j$.

In this scenario above, the user may stop the learning process at any time, exemplarily due to at least any one of the following reasons:
 i) the intermediate model has enough accuracy;
 ii) the intermediate model's accuracy is not significantly different from that of the complete model;
 iii) the estimated accuracy of the complete model is too low; or
 iv) the training time is unexpectedly long.

More specifically, for the example snapshot shown in FIG. 2, the user probably would want to continue the modeling, since it is worthwhile to spend approximately six more minutes to receive at least approximately $1,400 more donation (e.g., $14,289.50−$12,840.50), given a 99.7% confidence.

One of ordinary skill in the art would also readily recognize, after having read this application, that processing could be automatically terminated if accuracy or training time exceeds a predetermined or manually-entered threshold.

In this example, progressive modeling is applied to cost-sensitive learning. For cost-insensitive learning, the algorithm reports traditional accuracy in place of dollar amounts. "Cost-sensitive" means that each example carries a different benefit, such that different individuals may donate different amounts of money or do not donate at all. In contrast, "cost-insensitive" means that each example is equally important.

The overall accuracy is the total amount of rewards one would get by predicting correctly. Obviously, for a cost-sensitive application, one should concentrate on those individuals with a lot of donation capacity.

As will be explained later in more detail, this framework of scalable-cost sensitive learning is significantly more useful than a batch mode learning process, especially for a very large dataset. Moreover, with the technique of the present invention, the user can easily experiment with different algorithms, parameters, and feature selections without waiting for a long time for a result ultimately determined as being unsatisfactory.

Therefore, the present invention is capable of generating a relatively small number of base classifiers to estimate the performance of the entire ensemble when all base classifiers are produced.

Without a loss of generality for discussing the underlying theory of the technique of the present invention, it is assumed that a training set S is partitioned into K disjoint subsets $S_j$, and that each subset is equal in size. As to the sequence in processing the subsets, if it is assumed that the distribution of the dataset is uniform, each subset can be taken sequentially. Otherwise, the dataset can either be completely "shuffled", or random sampling without replacement can be used, to draw $S_j$ (e.g., select one of the subsets to be processed next).

A base level model $C_j$ is then trained from $S_j$. If there is no additional data, $S_j$ can be used for both training and validation. Otherwise, $S_j$ is used for training and a completely separate holdout set apart from S (e.g., a superset of $S_j$) is used for validation.

Given an example x from a validation set $S_v$ (it can be a different dataset or the training set), model $C_j$ outputs probabilities for all possible class labels that x may be an instance of, i.e., $p_j(l_i|x)$ for class label $l_i$. Classes $l_i$ are structures in the dataset, such as "donor", "non-donor", "fraud", and "non-fraud". Details on how to calculate $p_j(l_i|x)$ are found below. In addition, a benefit matrix $b[l_i, l_j]$ records the benefit received by predicting an example of class $l_i$ to be an instance of class $l_{i'}$.

An exemplary benefit matrix 300 for the charitable donation, in which the cost of sending a letter is assumed to be $0.68, is shown in FIG. 3. It can be seen that there are two possible predictions 301: either an individual "will donate" or the individual "will not donate".

There are also two possible actual outcomes 302: either the individual does "donate" or the individual "does not donate".

The benefit matrix provides the benefit for each possible prediction/outcome:
 the benefit 303 if the individual is predicted to donate and does donate would be Y(x)−$0.68;
 the benefit 304 if the individual is predicted to donate but does not donate would be −$0.68; and
 the benefit 305, 306 if the individual is predicted to "not donate" is zero, since no letter would be sent to that individual.

In contrast, for cost-insensitive (or accuracy-based) problems, . . . i, $b[l_i, l_j]$=1 and . . . i!j, $b[l_i, l_j]$=0. Since traditional accuracy-based decision making is a special case of cost-sensitive problem, only the algorithm in the context of cost-sensitive decision making is discussed herein. Using the benefit matrix b[ . . . ], each model Cj will generate an expected benefit or risk $e_j(l_i|x)$ for every possible class $l_i$.

$$\text{Expected Benefit } e_j(l_i|x) = \sum_{l_{i'}} b[l_{i'}, l_i] \cdot p_j(l_{i'}|x) \qquad (1)$$

It is now assumed that k, k≦K, models $\{C_1, \ldots, C_k\}$ have been trained. Combining individual expected benefits, mathematically:

$$\text{Average Expected Benefit: } E_k(l_i \mid x) = \frac{\sum_j e_j(l_i \mid x)}{k} \quad (2)$$

Optimal decision policy can now be used to choose the class label with the maximal expected benefit:

$$\text{Optimal Decision: } L_k(x) = \operatorname{argmax}_{l_i} E_k(l_i \mid x) \quad (3)$$

Assuming that $l(x)$ is the true label of x, the accuracy of the ensemble with k classifiers is:

$$A_k = \sum_{x \in S_v} b[l(x), L_k(x)] \quad (4)$$

For accuracy-based problems, $A_k$ is usually normalized into a percentage using the size of the validation set $|S_v|$. For cost-sensitive problems, it is customary to use some units to measure benefits such as dollar amounts. Besides accuracy, there is also the total time to train $C_1$ to $C_k$:

$$T_k = \text{the total time to train } \{C_1, \ldots C_k\} \quad (5)$$

Next, based on the performance of $k \leq K$ base classifiers, statistical techniques are used to estimate both the accuracy and training time of the ensemble with K models.

However, first, some notations are summarized. $A_K$, $T_K$ and $M_K$ are the true values to estimate. Respectively, they are the accuracy of the complete ensemble, the training time of the complete ensemble, and the remaining training time after k classifiers. Their estimates are denoted in lower case, i.e., $\alpha_K$, $t_K$ and $m_K$.

An estimate is a range with a mean and standard deviation. The mean of a symbol is represented by a bar ($^-$) and the standard deviation is represented by a sigma ($\sigma$) Additionally, $\sigma_d$ is standard error or the standard deviation of a sample mean.

Estimating Accuracy

The accuracy estimate is based on the probability that $l_i$ the predicted label by the ensemble of K classifiers for example x.

$$P\{L_K(x) = l_i\} \quad (6)$$

is the probability that $l_i$ is the prediction by the ensemble of size K. Since each class label $l_i$ has a probability to be the predicted class, and predicting an instance of class $l(x)$ as $l_i$ receives a benefit $b[l(x), l_i]$, the expected accuracy received for x by predicting with K base models is:

$$\overline{\alpha}(x) = \sum_{l_i} b[l(x), l_i] \cdot P\{L_K(x) = l_i\} \quad (7)$$

with standard deviation of $\sigma(\alpha(x))$. To calculate the expected accuracy on the validation set $S_v$, p the expected accuracy on each example x is summed up:

$$\overline{\alpha}_K = \sum_{x \in S_v} \overline{\alpha}(x) \quad (8)$$

Since each example is independent, according to the multinomial form of the central limit theorem (CLT), the total benefit of the complete model with K models is a normal distribution with mean value of Eqn. [8] and standard deviation of:

$$\sigma(a_K) = \sqrt{\sum_{x \in S_v} \sigma(\alpha(x))^2} \quad (9)$$

Using confidence intervals, the accuracy of the complete ensemble $A_K$ falls within the following range:

$$\text{With confidence } p, A_K \in \overline{\alpha_K} \pm t \cdot \sigma(\alpha_K) \quad (10)$$

When $t=3$, the confidence p is approximately 99.7%.

Next is discussed the process of deriving $P\{L_K(x) = l_i\}$. If $E_K(l_i \mid x)$ is known, there is only one label, $L_K(x)$ whose $P\{L_K(x) = l_i\}$ will be 1, and all other labels will have probability equal to 0. However, if $E_K(l_i \mid x)$ is not known, only its estimate $E_k(l_i \mid x)$ measured from k classifiers to derive $P\{L_K(x) = l_i\}$ can be used.

From random sampling theory, $E_k(l_i \mid x)$ is an unbiased estimate of $E_K(l_i \mid x)$ with standard error of:

$$\sigma_d(E_k(l_i \mid x)) = \sigma(E_k(l_i \mid x))/\sqrt{k} \cdot \sqrt{1-f} \text{ where } f = k/K \quad (11)$$

According to the central limit theorem, the true value $E_K(l_i \mid x)$ falls within a normal distribution with mean value of $\mu = E_k(l_i \mid x)$ and standard deviation of $\sigma = \sigma_d(E_k(l_i \mid x))$. If $E_K(l_i \mid x)$ is high, it is more likely for $E_k(l_i \mid x)$ to be high, and consequently, for $P\{L_k(x) = l_i\}$ to be high.

For the time being, the correlation among different class labels can be ignored, and naïve probability $P'\{L_K(x) = l_i\}$ can be computed. Assuming that $r_t$ is an approximate of max $l_i$ ($E_K(l_i \mid x)$), the area 401 in the range of $[r_t, +\infty]$ is the probability $P'\{L_K(x) = l_i\}$, as exemplarily shown in FIG. 4:

$$P'\{L_K(x) = l_i\} = \int_{r_t}^{+\infty} \frac{1}{\sqrt{2\pi}\,\sigma} \exp\left[-\frac{1}{2}\left(\frac{z-u}{\sigma}\right)^2\right] dz \quad (12)$$

where $\sigma = \sigma_d(E_K(l_i \mid x))$ and $\mu = E_k(l_i \mid x)$.

When $k \leq 30$, to compensate the error in standard error estimation, the Student-t distribution with $df=k$ can be used. The average of the two largest $E_K(l_i \mid x)$'s is used to approximate $\max_{l_i}(E_K(l_i \mid x))$.

The reason not to use the maximum itself is that if the associated label is not the predicted label of the complete model, the probability estimate for the true predicted label may be too low.

On the other hand, $P\{L_k(x) = l_i\}$ is inversely related to the probabilities for other class labels to be the predicted label. When it is more likely for other class labels to be the predicted label, it will be less likely for $l_i$ to be the predicted label. A common method to take correlation into account is to use normalization, $$P\{L_k(x) = l_i\} = \frac{P'\{L_K(x) = l_i\}}{\sum_j P'\{L_K(x) = l_j\}} \quad (13)$$

Thus, $P\{L_k(x) = l_i\}$ has been derived, in order to estimate the accuracy in Eqn.[7].

Estimating Training Time

It is assumed that the training time for the sampled k models are $\tau_1$ to $\tau_k$. Their mean and standard deviation are $\overline{\tau}$ and $\sigma(\tau)$. Then the total training time of K classifiers is estimated as, with confidence p, $T_K \in \bar{t}_K \pm t \cdot \sigma(t_K)$ where $\bar{t}_K = K \cdot \bar{\tau}$ and $$\sigma(t_K) = \frac{t \cdot K \cdot \sigma(\tau)}{\sqrt{k}} \cdot \sqrt{1-f}. \quad (14)$$

To find out remaining training time $M_K$, $k \cdot \bar{\tau}$ is simply deducted from Eqn. [14], with confidence p, $M_K \in \overline{m_K} \pm t \cdot \sigma(m_K)$ where $\overline{m_K} = \bar{t}_K - k \cdot \bar{\tau}$ and $$\sigma(m_K) = \sigma(t_K) \quad (15)$$

Putting it Together

In comparing FIG. 1 with the basic algorithm shown below, details of an exemplary embodiment of the present invention should now be apparent. In the first step, the first random sample from the database is requested and the first model $C_1$ is trained. Then, the second random sample is requested and the second model $C_2$ is trained.

From this point on, in this exemplary embodiment, the user will be updated with estimated accuracy, remaining training time and confidence levels. The accuracy of the current model ($A_k$), the estimated accuracy of the complete model ($\alpha_K$), as well as estimated remaining training time ($m_K$) are all available. From these statistics, the user decides to continue or terminate. Typically, the user would usually terminate learning if one of the following stopping criteria are met:

The accuracy of the current model is sufficiently high. That is, assuming that $\theta_A$ is the target accuracy, this criterion becomes: $A_k \geq \theta_A$.

The accuracy of the current model is sufficiently close to that of the complete model. That is, there would not be significant improvement by training the model to the end. More precisely, and using the terminology above, $t \cdot \sigma(\alpha_K) \leq \epsilon$.

The estimated accuracy of the final model is too low to be useful. More formally, if $(\overline{\alpha_K} + t \cdot \sigma(\alpha_K)) \square \theta_A$, then stop the learning process.

The estimated training time is too long, and the user decides to abort. More formally, assuming that $\theta_T$ is the target training time, then, if $(\overline{m_K} - t \cdot \sigma(m_K)) \square \theta_T$, the learning process should be canceled.

As a summary of all the important steps of progressive modeling, an exemplary algorithm, described in code summary format, is outlined below as Algorithm 1:

---
Algorithm 1: (Progressive Modeling
Based on Averaging Ensemble)
---
Data : benefit matrix b[ ], training set S, validation set Sv, and K
Result : k ≦ K classifiers
begin
    partition S into K disjoint subsets of equal size {S1, ..., Sk};
    train C1 from S1 and τ1 is the training time;
    k ← 2;
    while k ≦ K do
        train Ck from Sk and τk is the training time;
        for x ϵ $S_v$ do
            calculate P{LK = } (Eqn. [13])
            calculate and its standard deviation ((Eqn.[7]);
        end
        estimate accuracy(Eqn.[8], Eqn. [9]) and remaining training time
        (Eqn. [15]);
        if and satisfy stopping criteria then
            return C1, ..., Ck;
        end ---
-continued Algorithm 1: (Progressive Modeling
Based on Averaging Ensemble)
---
        k ← k + 1;
    end
    return C1, ..., Ck;
end

---

Efficiency

Computing K base models sequentially has complexity of $$K \cdot O\left(f\left(\frac{N}{K}\right)\right).$$

Both the average and standard deviation can be incrementally updated linearly in the number of examples.

Desiderata

The obvious advantage of the above averaging ensemble is its scalability and its ability to be estimated. The accuracy is also potentially higher than a single model trained in batch-mode from the entire dataset.

That is, the base models trained from disjoint data subsets make uncorrelated noisy errors to estimate expected benefits. It is known and has been studied that uncorrelated errors are reduced by averaging. The averaged expected benefits may still be different from the single classifier, but it may not make a difference to final prediction, as long as the predicted label by the single model remains to be the label with the maximum expected benefit.

The multiple model is very likely to have higher benefits because of its "smoothing effect" and stronger bias towards predicting expensive examples correctly. It is noted that the only interest is that of well-defined cost-sensitive problems (as contrary to ill-defined problems) where $\forall x, b[l(x), l(x)] \geq b\_\_^{-1}l(x), l_i]$.

In other words, correct prediction is always better than misclassification. For well-defined problems, $E(l(x), x)$ is monotonic in $p(l(x)|x)$. In order to make correct predictions, $p(l(x)|x)$ has to be bigger than a threshold $T(x)$, which is inversely proportional to $b[l(x), l(x)]$.

As an example, for the charity donation dataset, $$T(x) = \frac{\$0.68}{y(x)}$$

where y(x) is the donation amount and $0.68 is the cost to send a campaign letter. To explain the "smoothing effect", the cost-sensitive decision plot is used.

For each data point x, its decision threshold T(x) and probability estimate $p(l(x)|x)$ is plotted in the same figure. The sequence of examples on the x-axis is ordered increasingly by their T(x) values.

Figure 5A:
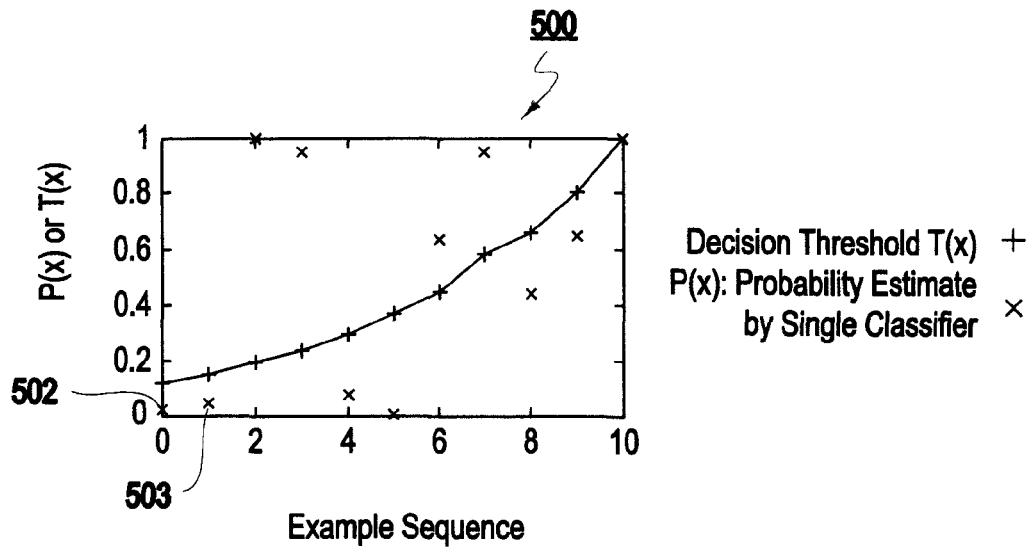
FIG. 5A shows a cost-sensitive decision plot 500 for a single classifier example.
Figure 5B:
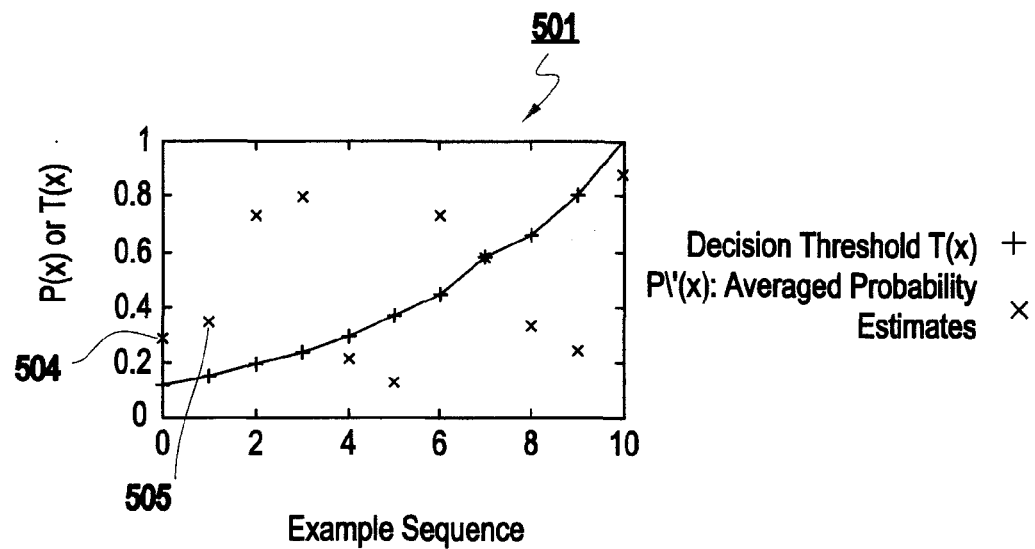
FIG. 5B shows a cost-sensitive decision plot 501 for an example of averaged probability of multiple classifiers.

FIGS. 5A and 5B illustrate two exemplary plots. FIG. 5A is conjectured for a single classifier, while FIG. 5B is conjectured for averaged probability of multiple classifiers. All data points above the T(x) line are predicted correctly.

Using these plots, the smoothing effect is now explained. Since probability estimates by multiple classifiers are uncorrelated, it is very unlikely for all of them to be close to either 1 or 0 (the extremities) and their resultant average will likely spread more "evenly" between 1 and 0. This is visually illustrated in these two figures by comparing the plot 501 in FIG. 5B to the plot 500 in FIG. 5A.

The smoothing effect favors more towards predicting expensive examples correctly. Thresholds T(x) of expensive examples are low. These examples are in the left portion of the decision plots. If the estimated probability by single classifier p(l(x)|x) is close to 0, it is very likely for the averaged probability p'(l(x)|x) to be bigger than p(l(x)|x)), and, consequently, bigger than T(x) of expensive examples and predict them to be positive. The two expensive data points 502, 503 in the bottom left corner of the decision plots are misclassified by the single classifier.

However, they are correctly predicted by the multiple model (labels 504, 505). Due to the smoothing effect, averaging of multiple probabilities biases more towards expensive examples than the single classifier. This is a desirable property since expensive examples contribute greatly towards total benefit. Cheaper examples have higher T(x), and they are shown in the right portion of both plots in FIGS. 5A and 5B.

If single classifier p(l(x)|x) for a cheap example is close to 1, it is more likely for the averaged probability p'(l(x)|x) to be lower than p(l(x)|x), and consequently lower than T(x) to be misclassified. However, cheap examples carry much less benefit than expensive examples. The bias towards expensive examples by the multiple model 501 still has potentially higher total benefits than the single model 500.

Calculating Probabilities

The calculation of p(l$_i$|x) is straightforward. For decision trees, such as C4.5®, and supposing that n is the total number of examples and n$_i$ is the number of examples with class l$_i$ in a leaf, then $$p(l_i | x) = \frac{n_i}{n}. \quad (16)$$

For cost-sensitive problems, in order to avoid skewed probability estimate at the leaf of a tree, curtailed probabilities or curtailment can be computed as has been proposed (e.g., see B. Zadrozny and C. Elkan, "Obtaining calibrated probability estimates from decision trees and naïve bayesian classifiers", *Proceedings of Eighteenth International Conference on Machine Learning* (ICML'2001), 2001.)

The search down the tree is stopped if the current node has fewer than v examples, and the probabilities are computed as in Eqn. [16]. The probabilities for decision rules, e.g. RIPPER ®, are calculated in a similar way as decision trees.

For naive Bayes classifier, assuming that $\alpha_j$'s are the attributes of x, p(l$_i$) is the prior probability or frequency of class l$_i$ in the training data, and p($\alpha_j$|l$_i$) is the prior probability to observe feature attribute value $\alpha_j$ given class label l$_i$, then the score n(l$_i$|x) for class label l$_i$ is:

$$n(l_i|x) = p(l_i)\Pi p(\alpha_j|l_i), \quad (17)$$

and the probability is calculated on the basis of n(l$_i$|x) as:

$$p(l_i | x) = \frac{n(l_i | x)}{\sum n(l_{i'} | x)} \quad (18)$$

The above probability estimate is known to be skewed. For cost-sensitive problems, it has been proposed to divide the score n(l$_i$|x) into multiple bins and compute the probability p(l$_i$|x) from each bin.

Experiment

In this experiment, there are two main issues: the accuracy of the ensemble and the precision of the estimation. The accuracy and training time of a single model computed from the entire dataset is regarded as the baseline.

To study the precision of the estimation methods, the upper and lower error bounds of an estimated value are compared to its true value. In this discussion, three datasets have carefully been selected. They are from real world applications and significant in size. Each dataset is used both as a traditional problem that maximizes traditional accuracy as well as a cost-sensitive problem that maximizes total benefits. As a cost-sensitive problem, the selected datasets differ in the way as to how the benefit matrices are obtained.

Datasets

The first dataset is the donation dataset that first appeared in KDDCUP'98 competition. It is supposed that the cost of requesting a charitable donation from an individual x is $0.68, and the best estimate of the amount that x will donate is Y(x). Its benefit matrix is shown in FIG. 3.

As a cost-sensitive problem, the total benefit is the total amount of received charity minus the cost of mailing. The data has already been divided into a training set and a test set. The training set includes 95,412 records for which it is known whether or not the person made a donation and how much the donation was. The test set contains 96,367 records for which similar donation information was not published until after the KDD'98 competition.

The standard training/test set splits were used to compare with previous results. The feature subsets were based on the KDD'98 winning submission. To estimate the donation amount, the multiple linear regression method was used. To avoid over estimation, only those contributions between $0 and $50 were used.

The second data set is a credit card fraud detection problem. Assuming that there is an overhead $90 to dispute and investigate a fraud and y(x) is the transaction amount, the following is the benefit matrix:

|  | Predict fraud | Predict not fraud |
| --- | --- | --- |
| Actual fraud | y(x) − $90 | 0 |
| Actual not fraud | −$90 | 0 |

As a cost-sensitive problem, the total benefit is the sum of recovered frauds minus investigation costs. The dataset was sampled from a one-year period and contains a total of 5M transaction records. The features record the time of the transaction, merchant type, merchant location, and past payment and transaction history summary. Data of the last month was used as test data (40, 038 examples) and data of previous months as training data (406, 009 examples).

The third dataset is the adult dataset from UCI repository. It is a widely used dataset to compare different algorithms on traditional accuracy. For cost-sensitive studies, a benefit of $2 is artificially associated to class label F and a benefit of $1 to class label N, as summarized below:

|  | Predict F | Predict N |
| --- | --- | --- |
| Actual F | $2 | 0 |
| Actual N | 0 | $1 |

The natural split of training and test sets is used, so the results can be easily duplicated. The training set contains 32,561 entries and the test set contains 16,281 records.

Experimental Setup

Three learning algorithms were selected: decision tree learner C4.5®, rule builder RIPPER ®, and naïve Bayes learner. A wide range of partitions, K ∈ {8, 16, 32, 64, 128, 256} were chosen. The accuracy and estimated accuracy is the test dataset.

Accuracy

Since the capability of the new framework for both traditional accuracy-based problems is studied, as well as cost-sensitive problems, each dataset is treated both as a traditional and cost-sensitive problem. The baseline traditional accuracy and total benefits of the batch mode single model are shown in the two columns under accuracy for traditional accuracy-based problem and benefits for cost-sensitive problem respectively in Table 1, below.

TABLE 1

| for C4.5 ®: | | |
|---|---|---|
| | Accuracy Based accuracy | Cost-sensitive benefit |
| Donation | 94.94% | $13,292.7 |
| Credit Card | 87.77% | $733,980 |
| Adult | 84.38% | $16,443 |
| for RIPPER ®: | | |
| | Accuracy Based accuracy | Cost-sensitive benefit |
| Donation | 94.94% | $0 |
| Credit Card | 90.14% | $712,541 |
| Adult | 84.84% | $19,725 |
| for NB: | | |
| | Accuracy Based accuracy | Cost-sensitive benefit |
| Donation | 94.94% | $13,928 |
| Credit Card | 85.46% | $704,285 |
| Adult | 82.86% | $16,269 |

These results are the baseline that the multiple model should achieve. It is noted that different parameters for RIPPER® on the donation dataset were experimented with. However, the most specific rule produced by RIPPER® contains only one rule that covers six donors and one default rule that always predicts donate. This succinct rule will not find any donor and will not receive any donations. However, RIPPER® performs reasonably well for the credit card and adult datasets.

For the multiple model, the results are first discussed when the complete multiple model is fully constructed. Then, the results of partial multiple model are presented. Each result is the average of different multiple models with K ranging from 2 to 256. In Table 2 below, the results are shown in two columns under accuracy and benefit.

TABLE 2

| for C4.5 ®: | | |
|---|---|---|
| | Accuracy Based accuracy | Cost-sensitive benefit |
| Donation | 94.94 +/− 0% | $14,702.9 +/− 458 |
| Credit Card | 90.37 +/− 0.5% | $804,964 +/− 32,250 |
| Adult | 85.6 +/− 0.6% | $16,435 +/− 150 |

TABLE 2-continued

| for RIPPER ®: | | |
|---|---|---|
| | Accuracy Based accuracy | Cost-sensitive benefit |
| Donation | 94.94 +/− 0% | $0 +/− 0 |
| Credit Card | 91.46 +/− 0.6% | $815,612 +/− 34,730 |
| Adult | 86.1 +/− 0.4% | $19,875 +/− 390 |
| for NB: | | |
| | Accuracy Based accuracy | Cost-sensitive benefit |
| Donation | 94.94 +/− 0% | $14,282 +/− 530 |
| Credit Card | 88.64 +/− 0.3% | $798,943 +/− 23,557 |
| Adult | 84.94 +/− 0.3% | $16,169 +/− 60 |

As the respective results in Tables 1 and 2 are compared, the multiple model consistently and significantly beat the accuracy of the single model for all three datasets, using all three different inductive learners. The most significant increase in both accuracy and total benefits is for the credit card dataset. The total benefits have been increased by approximately $7,000~$10,000; the accuracy has been increased by approximately 1%~3%. For the KDDCUP'98 donation dataset, the total benefit has been increased by $1400 for C4.5® and $250 for NB.

Figure 6A:
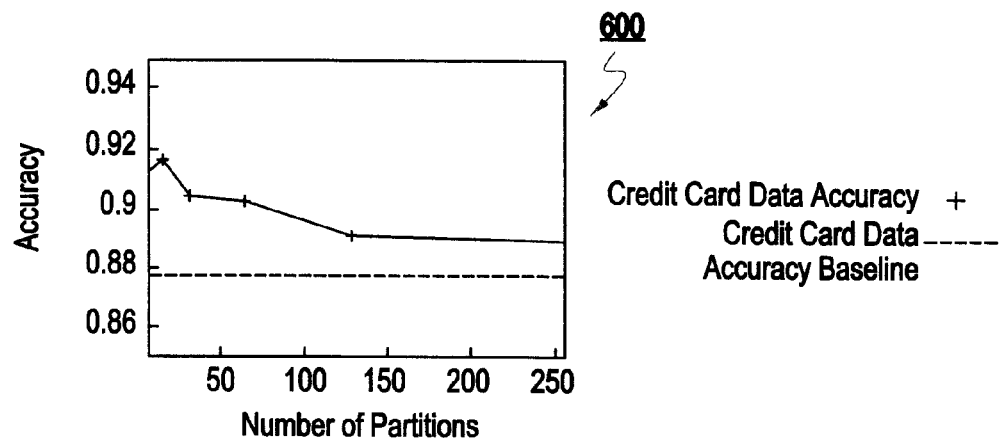
FIG. 6A shows a plot 600 of accuracy for a credit card dataset, as a function of a number of partitions.
Figure 6B:
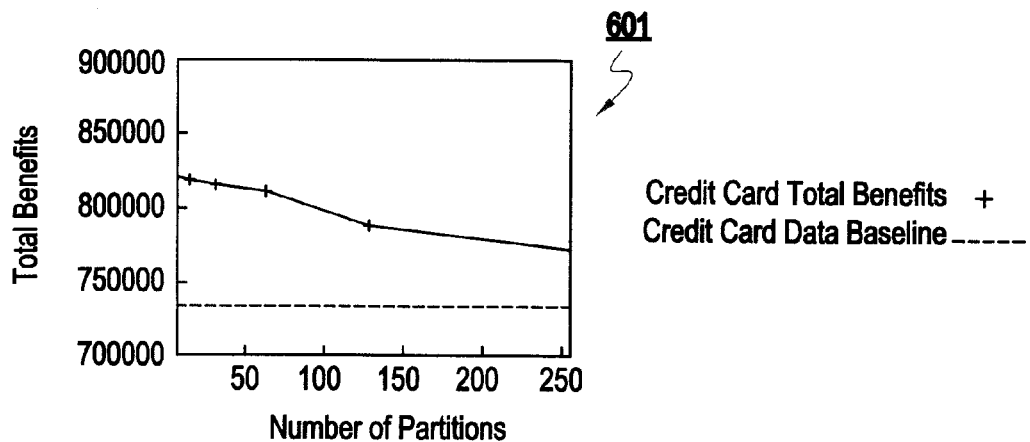
FIG. 6B shows a plot 601 for total benefits for a credit card dataset, as a function of a number of partitions.
Figure 6C:
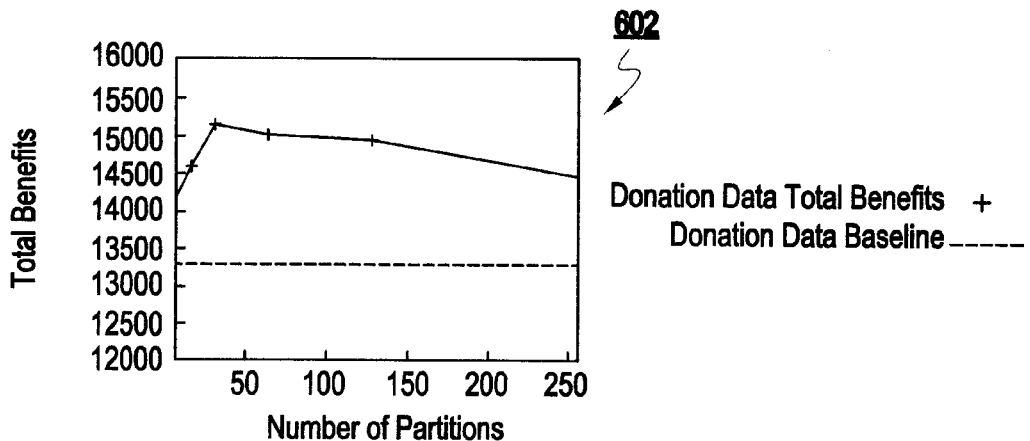
FIG. 6C shows a plot 602 for total benefits for a donation dataset, as a function of a number of partitions.

Next, the trends of accuracy are studied when the number of partitions K increases. In FIGS. 6A, 6B, and 6C, the accuracy and total benefits 600, 601, 602 for the credit card datasets and the total benefits for the donation dataset with increasing number of partitions K are plotted. The base learner for this study was C4.5®.

It can be clearly seen that for the credit card dataset, the multiple model consistently and significantly improve both the accuracy and total benefits over the single model by at least 1% in accuracy and $40,000 in total benefits for all choices of K. For the donation dataset, the multiple model boosts the total benefits by at least $1400. Nonetheless, when K increases, both the accuracy and total tendency show a slow decreasing trend. It would be expected that when K is extremely large, the results will eventually fall below the baseline.

Accuracy Estimation

The current and estimated final accuracy are continuously updated and reported to the user. The user can terminate the learning based on these statistics.

As a summary, these include the accuracy of the current model $A_k$, the true accuracy of the complete model AK and the estimate of the true accuracy $\bar{a}_K$ with $\sigma(\alpha_K)$.

If the true value falls within the error range of the estimate with high confidence and the error range is small, the estimate is good. More mathematically formally, with confidence p, $A_K \in \bar{a}_K \pm t \cdot \sigma(\alpha_K)$. Quantitatively, it can be said that an estimate is good if the error bound $(t \cdot \sigma)$ is within 5% of the mean and the confidence is at least 99%.

If k is assumed to be chosen such that $k=20\% \cdot K$, then in Table 3 below is shown the average of estimated accuracy of multiple models with different number of partitions K, where K is an element of the set {8, 16, 32, 64, 123, 256}. The true value $A_K$ all fall within the error range. The sampling size is 20% of population size K The number in estimated accuracy is the average of estimated accuracy with different K's. The error range is $3 \cdot \sigma(\alpha_K)$, with 99.7% confidence.

TABLE 3

| | Accuracy Based | | Cost-sensitive | |
|---|---|---|---|---|
| | True Val | Estimate | True Val | Estimate |
| For C4.5 ® | | | | |
| Donation | 94.94% | 94.94% +/− 0% | $14,702.90 | $14,913 +/− 612 |
| Credit Card | 90.37% | 90.08% +/− 1.5% | $804,964 | $799,876 +/− 3,212 |
| Adult | 85.6% | 85.3% +/− 1.4% | $16,435 | $16,255 +/− 142 |
| For RIPPER ® | | | | |
| Donation | 94.94% | 94.94% +/− 0% | $0 | $0 +/− 0 |
| Credit Card | 91.46 | 91.24% +/− 0.9% | $815,612 | $820,012 +/− 3,742 |
| Adult | 86.1% | 85.9% +/− 1.3% | $19,875 | $19,668 +/− 258 |
| For NB | | | | |
| Donation | 94.94% | 94.94% +/− 0% | $14,282 | $14,382 +/− 120 |
| Credit Card | 88.64% | 89.01% +/− 1.2% | $798,943 | $797,749 +/− 4,523 |
| Adult | 84.94% | 85.3% +/− 1.5% | $16,169 | $16,234 +/− 134 |

Figure 7A:
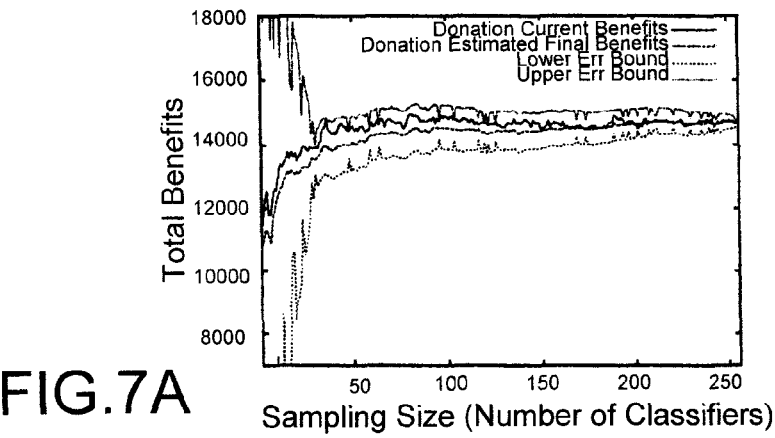
FIG. 7A shows plots 700 of current benefits and estimated final benefits when sampling size k increases up to K=256 for the donation dataset.
Figure 7B:
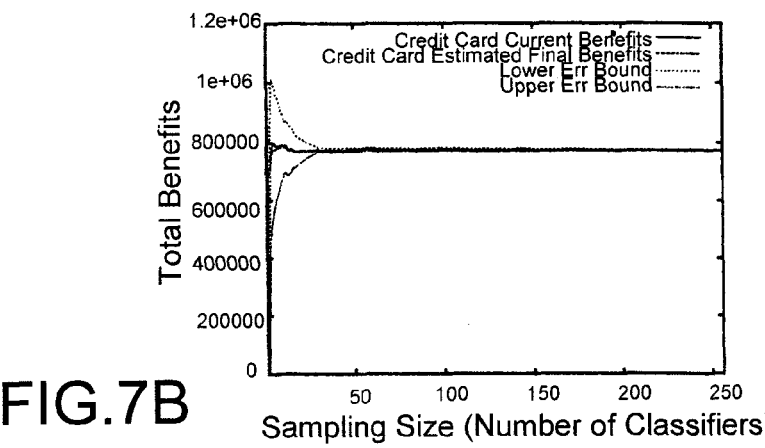
FIG. 7B shows plots 701 of current benefits and estimated final benefits when sampling size k increases up to K=256 for the credit card dataset.
Figure 7C:
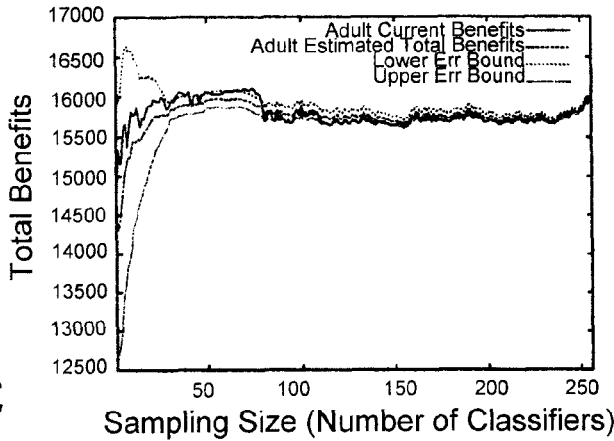
FIG. 7C shows plots 702 of current benefits and estimated final benefits when sampling size k increases up to K=256 for the adult dataset.

To see how quickly the error range converges with increasing sample size, the entire process is drawn to sample up to K=256 for all three datasets, as shown in FIGS. 7A, 7B, and 7C. The error range is $3 \cdot \sigma(\alpha_K)$ for 99.7% confidence.

There are four curves in each plot. The one on the very top and the one on the very bottom are the upper and lower error bounds. The current benefits and estimated total benefits are within the higher and lower error bounds. Current benefits and estimated total benefits are very close especially when k becomes big.

As shown clearly in all three plots, the error bound decreases exponentially. When k exceeds 50 (approximately 20% of 256), the error range is already within 5% of the total benefits of the complete model. If the accuracy of the current model is satisfactory, the learning process can be discontinued and the current model returned.

For the three datasets under study and different number of partitions K, when $k > 30\% \cdot K$, the current model is usually within 5% error range of total benefits by the complete model. Moreover, for traditional accuracy, the current model is usually within 1% error bound of the accuracy by the complete model (detailed results not shown).

Next, an experiment under extreme situations is discussed. When K becomes too large, each dataset becomes trivial and will not be able to produce an effective model. If the estimation methods can effectively detect the inaccuracy of the complete model, the user can choose a smaller K.

Figure 8A:
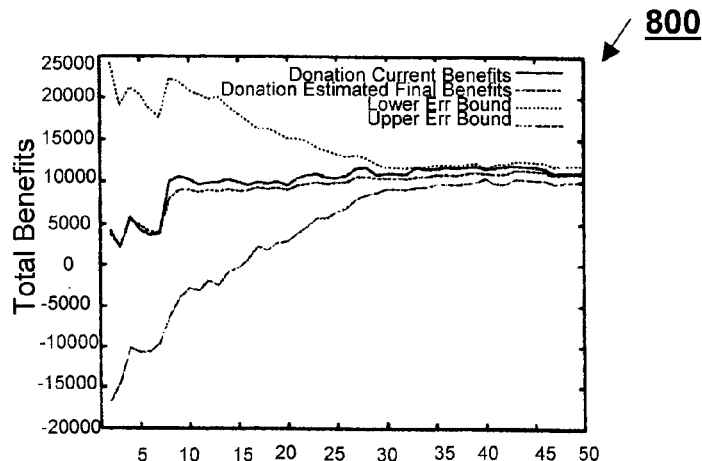
FIG. 8A shows plots 800 of current benefits and estimated final estimates when sampling size k increases up to K=1024 for the donation dataset.
Figure 8B:
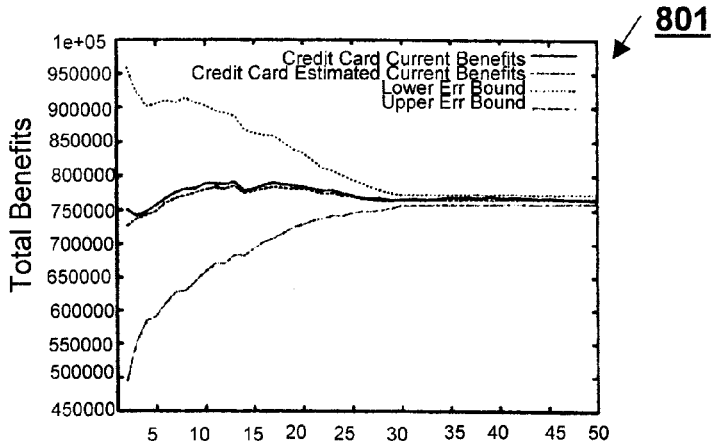
FIG. 8B shows plots 801 of current benefits and estimated final estimates when sampling size k increases up to K=1024 for the credit card dataset.
Figure 8C:
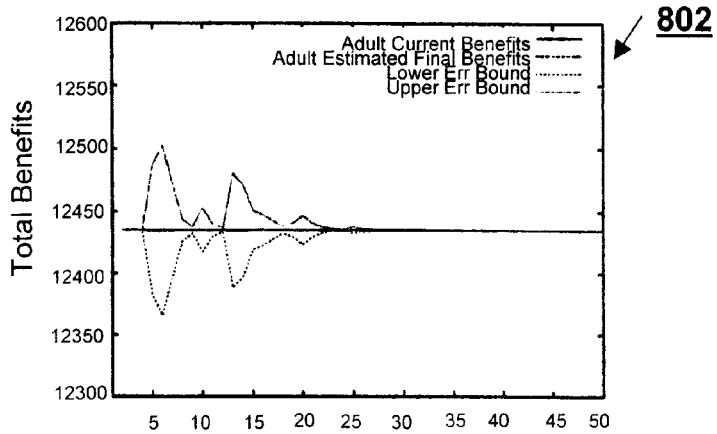
FIG. 8C shows plots 802 of current benefits and estimated final estimates when sampling size k increases up to K=1024 for the adult dataset.

All three dataset were partitioned into K=1024 partitions. For the adult dataset, each partition contains only 32 examples, but there are 15 attributes. The estimation results 800, 801, 802 are shown in FIGS. 8A, 8B, and 8C.

The first observation is that the total benefits for donation and adult are much lower than the baseline. This is obviously due to the trivial size of each data partition. The total benefits for the credit card dataset is $750,000, which is still higher than the baseline of $733,980.

The second observation is that after the sampling size k exceeds around as small as 25 (out of K=1024 or 0.5%), the error bound becomes small enough. This implies that the total benefits by the complete model is very unlikely (99.7% confidence) to increase. At this point, the user should realistically cancel the learning for both donation and adult datasets.

The reason for the "bumps" in the adult dataset plot is that each dataset is too small and most decision trees will always predict N most of the time. At the beginning of the sampling, there are no variations or all the trees make the same predictions. When more trees are introduced, it starts to have some diversities. However, the absolute value of the bumps are less than $50, as compared to $12,435.13

Table 3 above shows the true accuracy and estimated accuracy. The sampling size is 20% of population size K, where K ∈{8, 16, 32, 64, 128, 256}. The number in estimated accuracy is the average of estimated accuracy with different K's. The error range is $3 \cdot \sigma(\alpha_K)$ for 99.7% confidence.

Training Time Estimation

Figure 9:
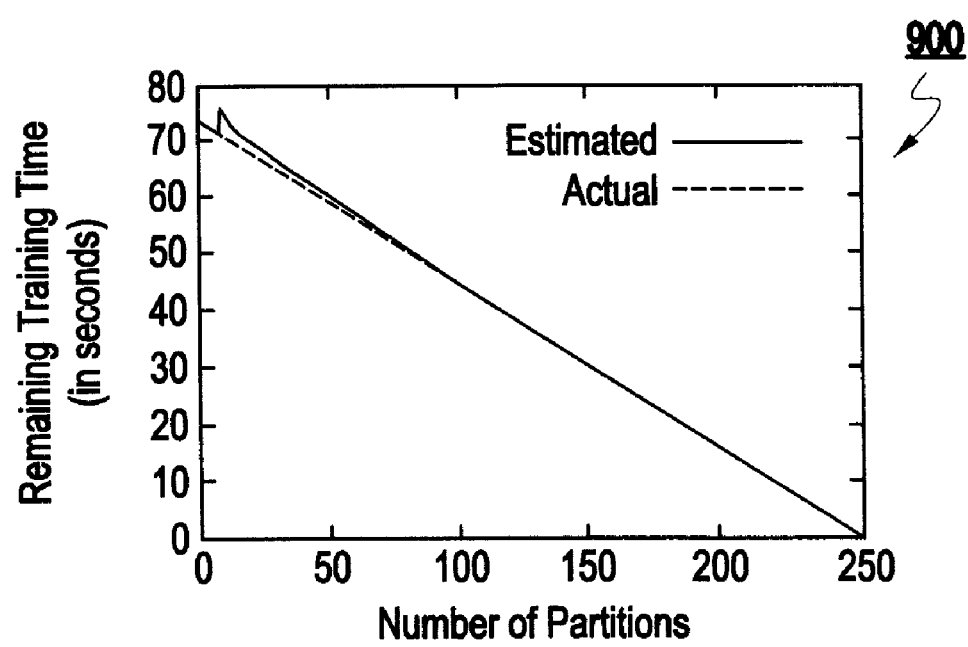
FIG. 9 shows a plot 900 of remaining training time for credit card dataset with K=256.

The remaining training time 900 using the sampled k base classifiers is also estimated. Only the results for credit card fraud detection with K=256 are shown in FIG. 9. The true remaining training time and its estimate are identical.

Training Efficiency

Both the training time of the batch mode single model, plus the time to classify the test data are recorded, as well as the training time of the multiple model with $k=30\% \cdot K$ classifiers, plus the time to classify the test data k times. The ratio of the recorded time of the single and multiple models, called serial improvement, is then computed. This is the number of times that training the multiple model is faster than training the single model.

Figure 10A:
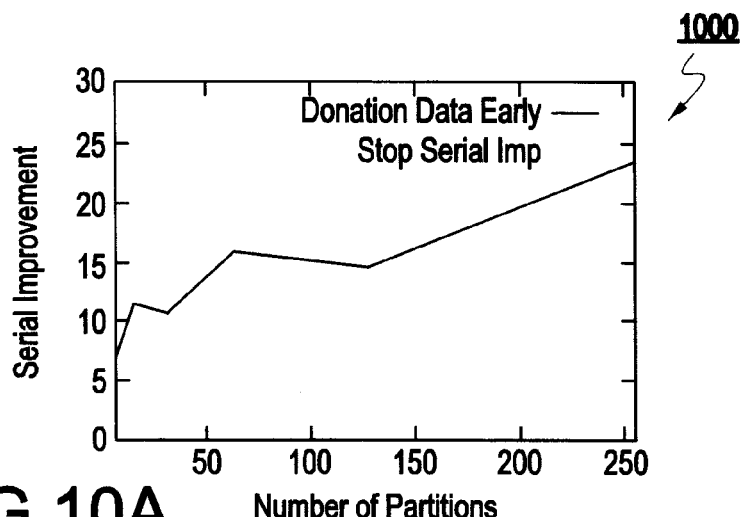
FIG. 10A shows a plot 1000 of serial improvement for the donation dataset when early stopping is used.
Figure 10B:
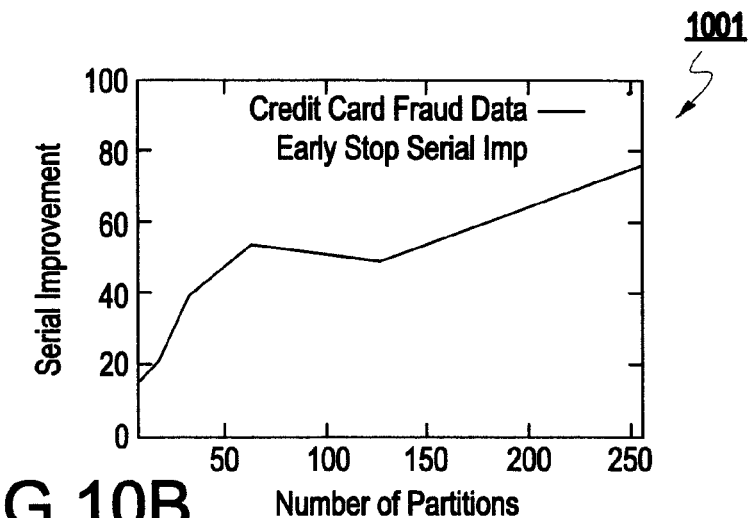
FIG. 10B shows a plot 1001 of serial improvement for the credit card dataset when early stopping is used.
Figure 10C:
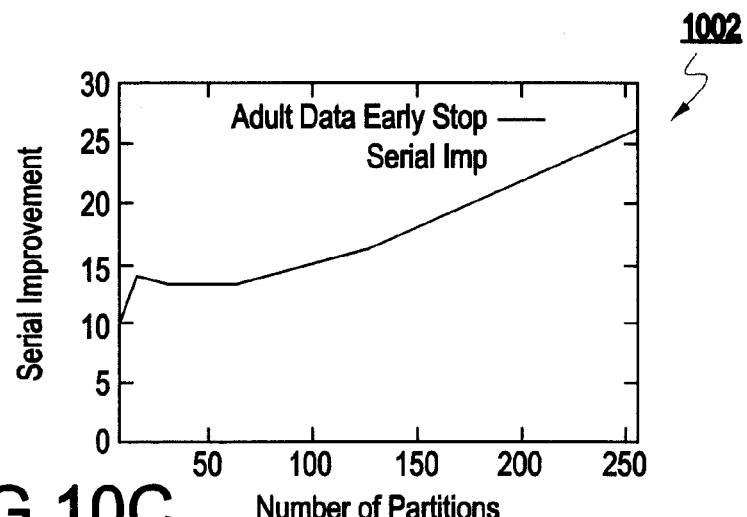
FIG. 10C shows a plot 1002 of serial improvement for the adult dataset when early stopping is used.
Figure 11A:
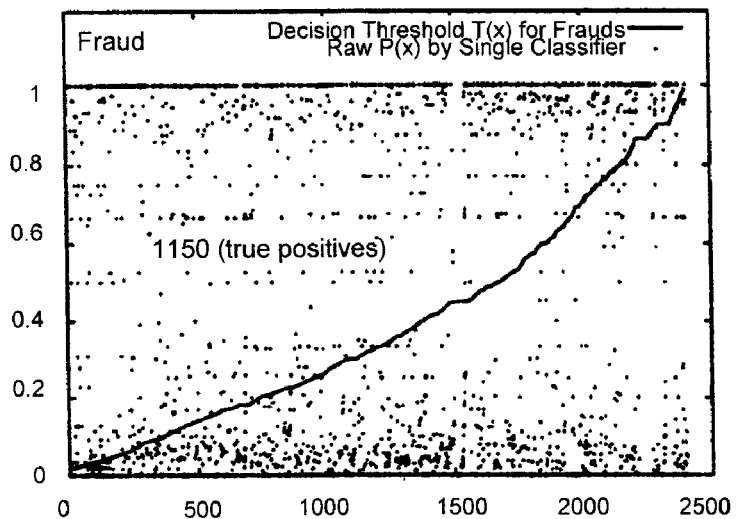
FIG. 11A shows a plot 1100 of the decision threshold and probability output (true positives) by the single model for the credit card dataset.
Figure 11B:
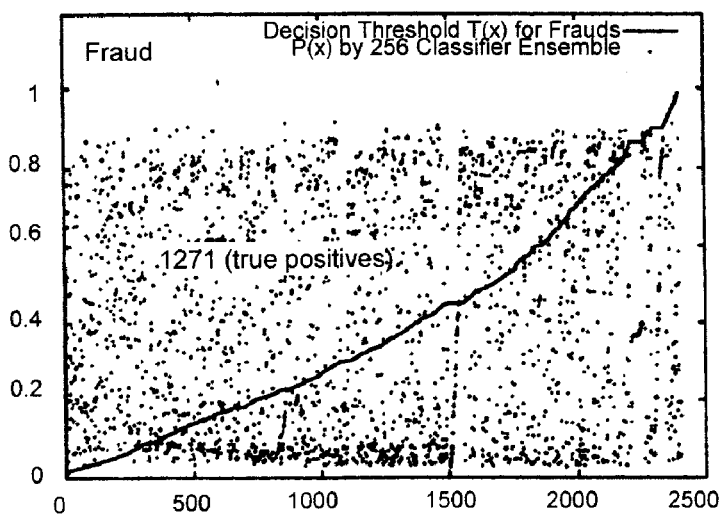
FIG. 11B shows a plot 1101 of the decision threshold and probability output (true positives) by the 256-ensemble model for the credit card dataset.
Figure 11C:
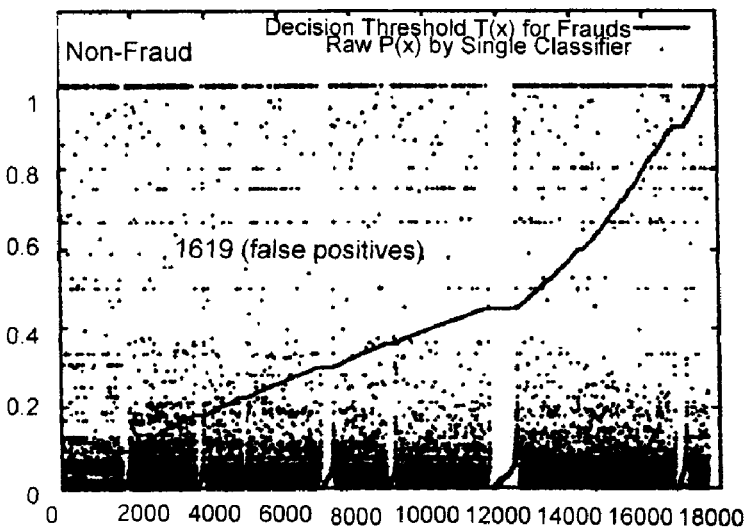
FIG. 11C shows a plot 1102 of the decision threshold and probability output (false positives) by the single model for the credit card dataset.
Figure 11D:
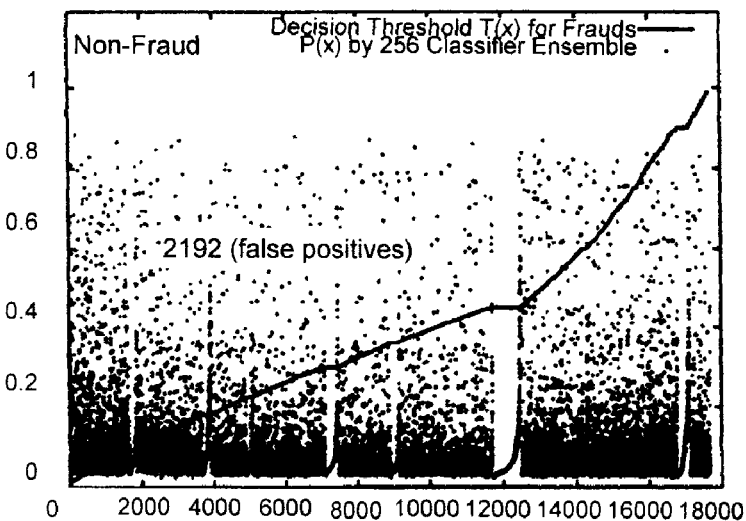
FIG. 11D shows a plot 1103 of the decision threshold and probability output (false positives) by the 256-ensemble model for the credit card dataset.

In FIGS. 10A, 10B, and 10C, the serial improvement 1000, 1001, 1002 is plotted for all three datasets, using C4.5 as the base learner. When K=256, using the multiple model not only provides higher accuracy, but the training time is also 80 times faster for credit card, 25 times faster for both adult and donation.

Smoothing Effect

In FIGS. 11A, 11B, 11C, and 11D, decision plots (as defined above) 1100, 1101, 1102, 1103 are plotted for the credit card fraud dataset. K is chosen so that K=256 for the multiple model. The number on each plot shows the number of examples (to show these numbers clearly on the plot, the surrounding data points around the text area are not plotted) whose $P(x) > T(x)$ (predicted as frauds).

The top two plots (FIGS. 11A and 11B) are fraudulent transactions and the bottom plots (FIGS. 11C and 11D) are non-fraudulent transactions. The overall effect of the averaging ensemble increases the number of true positives from 1150 to 1271 and the number of false positives from 1619 to 2192. However, the average transaction amount of the "extra number" of detected frauds by the ensemble (121=1271−1150) is around $2400, which greatly overcomes the cost of extra false alarm ($90 per false alarm).

Thus, as demonstrated above, for problems like credit card fraud, donation, and catalog mailing, where positive examples have varied profits and negative examples have low or fixed cost, the ensemble methods tend to beat the single model.

Exemplary Hardware Implementation

FIG. 12 illustrates a typical hardware configuration of an information handling/computer system 1200 in accordance with the invention and which preferably has at least one processor or central processing unit (CPU) 1211.

The CPUs 1211 are interconnected via a system bus 1212 to a random access memory (RAM) 1214, read-only memory (ROM) 1216, input/output (I/O) adapter 1218 (for connecting peripheral devices such as disk units 1221 and tape drives 1240 to the bus 1212), user interface adapter 1222 (for connecting a keyboard 1224, mouse 1226, speaker 1228, microphone 1232, and/or other user interface device to the bus 1212), a communication adapter 1234 for connecting an information handling system to a data processing network, the Internet, an Intranet, a personal area network (PAN), etc., and a display adapter 1236 for connecting the bus 1212 to a display device 1238 and/or printer 1239 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1211 and hardware above, to perform the method of the invention.

This signal-bearing media may include, for example, a RAM contained within the CPU 1211, as represented by the fast-access storage for example. Alternatively, the instructions may be contained in another signal-bearing media, such as a magnetic data storage diskette 1300 (FIG. 13), directly or indirectly accessible by the CPU 1211.

Whether contained in the diskette 1300, the computer/CPU 1211, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

The Present Invention as an Apparatus with Software Modules

In another aspect of the present invention, it will be readily recognized that the exemplary information handling/computer system 1200 or the exemplary magnetic data storage diskette 1300 shown in FIGS. 12 and 13, respectively, as embodying the present invention in the form of software modules, might include a computer program 1400 having software modules exemplarily shown in FIG. 14.

Software module 1401 comprises a graphic user interface (GUI) to allow a user to enter parameters, control the progressive learning model development, and view results. Software module 1402 comprises a memory interface to allow data from the database to be retrieved for the model development and to store results as the modeling progresses.

Software module 1403 comprises a module that divides the database data into the N segments for the progressive modeling. Software module 1404 comprises a calculator for developing the base classifier for each segment. Finally, software module 1405 comprises a calculator for developing the ensemble model from the base classifiers.

The Present Invention as a Business Method/Service

In yet another aspect of the present invention and as one of ordinary skill in the art would readily recognize after having read this application, the technique discussed herein has commercial value as well as academic value.

That is, the present invention significantly increases both accuracy of the model and the throughput of prediction (e.g., by at least 1000% to 2000%). If the training time by a conventional ensemble takes one day, using the approach of the present invention, it would take about one hour. These benefits are significant, since they mean that using this approach, the same amount of hardware can process twice to ten times as much data. Such a significant increase in throughput will scale up many applications, such as homeland security, stock trading surveillance, fraud detection, aerial space images, and others, where the volume of data is very large.

Therefore, as implemented as a component in a service or business method, the present invention would improve accuracy and speed in any application that uses inductive learning models. This commercial aspect is intended as being fully encompassed by the present invention.

One of ordinary skill in the art, after having read the present application, would readily recognize that this commercial aspect could be implemented in a variety of ways. For example, a computing service organization or consulting service that uses inductive learning techniques as part of their service would benefit from the present invention. Indeed, any organization that potentially relies on results of modeling by inductive learning techniques, even if these results were provided by another, could benefit from the present invention.

It would also be readily recognized that the commercial implementation of the present invention could be achieved on a computer network, such as the Internet, and that various parties could be involved in an implementation such as on the Internet. Thus, for example, a service provider might make available to clients one or more inductive learning modeling programs that incorporate the present invention. Alternatively, a service provider might provide the service of executing the present invention on a database provided by a client.

All of these variations of commercial implementations of the present invention, and any others that one of ordinary skill in the art, after reading the present application, would recognize as within the scope of the present invention, are considered as being encompassed by this invention.

While the invention has been described in terms of exemplary embodiments, those skilled in the art will recognize that the invention can be practiced with modification within the spirit and scope of the appended claims.

Further, it is noted that Applicants' intent is to encompass equivalents of all claim elements, even if amended later during prosecution.

Having thus described our invention, what we claim as new and desire to secure by Letters Patent is as follows:

1. A method of processing an inductive learning model for a database containing a dataset of examples, said method comprising:
   dividing said dataset of examples into a plurality of subsets of data; and
   generating, using a processor on a computer, a learning model using examples of a first subset of data of said plurality of subsets of data, wherein:
      said learning model being generated for said first subset comprises an initial stage of an evolving aggregate learning model (ensemble model) for an entirety of said dataset, said ensemble model thereby providing an evolving estimated learning model for the entirety of said dataset if all said subsets were to be processed, and
      said generating said learning model using data from a subset includes calculating a value for at least one parameter that provides an objective indication of an adequacy of a current stage of said ensemble model.

2. The method of claim 1, wherein said examples in said dataset comprise feature vectors usable as inputs into an inductive learning model.

3. The method of claim 2, wherein said dataset of examples comprises historical data and each said feature vector comprises a value for each of one or more attributes potentially useful to make predictions of future events, in accordance with said processing of said inductive learning model.

4. The method of claim 3, wherein said historical data comprises data related to one of:
   fraud detection;
   campaign contributions;
   catalog mailings;
   loan approval;
   homeland security;
   stock trading surveillance; and
   security and exchange.

5. The method of claim 1, wherein said at least one parameter comprises at least one of a current accuracy and an estimated final accuracy, said current accuracy indicating a calculated accuracy of said ensemble model at a current stage, said estimated final accuracy indicating a calculated estimated accuracy of said ensemble model if all of said subsets of data were to be processed.

6. The method of claim 5, wherein each said example in said dataset carries at least one benefit and said accuracy comprises an overall accuracy that reflects an estimated total amount of reward from benefit values in said examples.

7. The method of claim 6, wherein at least one said benefit is not equal for all said examples, said learning thereby comprising a cost-sensitive learning, and said accuracy comprises an overall accuracy that reflects an estimated total amount of reward from said benefits in view of a cost-sensitivity due to said at least one benefit not being equal.

8. The method of claim 1, further comprising progressively forming said ensemble model of said dataset, using said processor, by sequentially generating a learning model for each of a successive one of said plurality of subsets, until one of:
   a value calculated for said at least one parameter crosses a predefined threshold that indicates that an adequate estimated learning model for the entirety of the dataset has been achieved;
   said processing is terminated by a user input; and
   all subsets of said plurality of subsets have been processed in said inductive learning model.

9. The method of claim 8, wherein said calculating a value for each of said at least one parameter is periodically repeated as said ensemble model is progressively formed, thereby providing an updated objective indication to a user of a benefit of continuing the processing of the ensemble model.

10. The method of claim 8, wherein, upon completing processing for a subset of data, one or more of said at least one parameter is displayed to a user, permitting said user to selectively terminate said processing of the inductive learning model if an adequate ensemble model has been achieved.

11. The method of claim 1, wherein said at least one parameter comprises an estimated training time to complete development of said ensemble model if all subsets of said plurality of subsets of data were to be processed.

12. The method claim 1, further comprising:
   if a desired adequacy of said ensemble model has not yet been reached, successively using another of said subsets of data to further refine said ensemble model until a desired adequacy of said ensemble model has been achieved, as indicated by said objective indication of adequacy;
   terminating said generating said learning model if one of a user termination instruction is received or said objective indication of adequacy crosses a predefined threshold;
   applying said learning model that was generated to other data stored in a memory; and
   providing an output result of said applying said learning model to said other data.

13. The method of claim 12, as embodied in a set of computer-readable machine instructions stored in a tangible storage medium.

14. The method claim 1, further comprising initially dividing said dataset into two portions, a first portion used to provide said plurality of subsets and a second portion used as a validation set for said generated learning model.

15. The method of claim 14, further comprising using said validation set to calculate a predicted accuracy for said generated learning model.

16. The method of claim 1, as embodied in a set of computer-readable machine instructions stored in a tangible storage medium.

17. An apparatus, comprising:
   a database divider, as executed by a processor of said apparatus, for dividing a dataset of example data into N subsets of data;
   a base classifier calculator, as executed by said processor, for developing a learning model for example data in a subset of said N subsets;
   an ensemble calculator, as executed by said processor, for progressively developing an evolving aggregate learning model (ensemble model) by successively integrating learning models from successive subsets of said N subsets, said ensemble calculator further calculating at least one parameter that provides an objective indication of an adequacy of a current stage of said ensemble model;
   a memory interface, as executed by said processor, to retrieve data from a memory and to store data as said ensemble model is progressively developed; and a graphical user interface (GUI), as executed by said processor, to permit user inputs and to display information to said user.

18. The apparatus of claim 17, wherein said ensemble calculator further applies said ensemble model that was generated to other data stored in a memory.

19. A storage medium tangibly embodying a program of machine-readable instructions executable by a digital processing apparatus to perform a method of processing an inductive learning model for a dataset of examples, said method comprising:

dividing said dataset of examples into a plurality of subsets of data; and generating, using a processor on a computer, a learning model using examples of a first subset of data of said plurality of subsets of data, wherein:

said learning model being generated for said first subset comprises an initial stage of an evolving aggregate learning model (ensemble model) for an entirety of said dataset, said ensemble model thereby providing an evolving estimated learning model for the entirety of said dataset if all said subsets were to be processed, and said generating said learning model using data from a subset includes calculating a value for at least one parameter that provides an objective indication of an adequacy of a current stage of said ensemble model.

20. The storage medium of claim 19, said method further comprising:

if a desired adequacy of said ensemble model has not yet been reached, successively using another of said subsets of data to further refine said ensemble model until a desired adequacy of said ensemble model has been achieved, as indicated by said objective indication of adequacy;

terminating said generating said learning model if one of a user termination instruction is received or said objective indication of adequacy crosses a predefined threshold;

applying said learning model to other data stored in a memory, as based upon a user input instruction; and providing an output result of said applying said learning model to said other data.

* * * * *